United States Patent
Huang et al.

(10) Patent No.: US 12,368,188 B2
(45) Date of Patent: Jul. 22, 2025

(54) ION SELECTIVE MEMBRANE FOR SELECTIVE ION PENETRATION IN ALKALINE BATTERIES

(71) Applicant: RESEARCH FOUNDATION OF THE CITY UNIVERSITY OF NEW YORK, New York, NY (US)

(72) Inventors: Jinchao Huang, New York, NY (US); Gautam G. Yadav, New York, NY (US); Michael Nyce, New York, NY (US); Sanjoy Banerjee, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 327 days.

(21) Appl. No.: 16/634,819

(22) PCT Filed: Aug. 30, 2018

(86) PCT No.: PCT/US2018/048844
§ 371 (c)(1),
(2) Date: Jan. 28, 2020

(87) PCT Pub. No.: WO2019/046575
PCT Pub. Date: Mar. 7, 2019

(65) Prior Publication Data
US 2020/0381690 A1    Dec. 3, 2020

Related U.S. Application Data

(60) Provisional application No. 62/552,780, filed on Aug. 31, 2017.

(51) Int. Cl.
*H01M 10/24* (2006.01)
*H01M 50/403* (2021.01)
(Continued)

(52) U.S. Cl.
CPC ......... *H01M 10/24* (2013.01); *H01M 50/403* (2021.01); *H01M 50/414* (2021.01);
(Continued)

(58) Field of Classification Search
CPC .. H01M 50/449; H01M 10/24; H01M 50/403; H01M 50/411; H01M 50/431;
(Continued)

(56) References Cited

U.S. PATENT DOCUMENTS 4,361,632 A * 11/1982 Weber ................. H01M 50/403
429/251
2007/0160902 A1* 7/2007 Ando ................... H01M 50/411
429/144

(Continued)

FOREIGN PATENT DOCUMENTS

CN    102017232 A    4/2011
CN    103219533 A    7/2013
(Continued)

OTHER PUBLICATIONS

International Preliminary Report on Patentability dated Mar. 12, 2020, for International Application No. PCT/US2018/048844, filed on Aug. 30, 2018.
(Continued)

*Primary Examiner* — Matthew T Martin
*Assistant Examiner* — Grace Ann Kenlaw
(74) *Attorney, Agent, or Firm* — Andrew M. Metrailer; Conley Rose, P.C.

(57) ABSTRACT

An alkaline battery comprises an anode, a cathode, a separator disposed between the anode and the cathode, and an electrolyte in fluid communication with the anode, the cathode, and the separator. The separator comprises at least one ion selective layer that can include at least one of graphene, graphene oxide, reduced graphene oxide, func- (Continued)

tionalized graphene, or combinations thereof. This can allow the ion selective layer to be configured to selectively block zincate ions.

25 Claims, 6 Drawing Sheets

(51) Int. Cl.
*H01M 50/414* (2021.01)
*H01M 50/431* (2021.01)
*H01M 50/44* (2021.01)
*H01M 50/451* (2021.01)
*H01M 50/457* (2021.01)
*H01M 50/489* (2021.01)

(52) U.S. Cl.
CPC ......... *H01M 50/431* (2021.01); *H01M 50/44* (2021.01); *H01M 50/451* (2021.01); *H01M 50/457* (2021.01); *H01M 50/489* (2021.01); *H01M 2300/0014* (2013.01)

(58) Field of Classification Search
CPC ......... H01M 50/44; H01M 2300/0014; H01M 4/06; H01M 4/24; H01M 4/244; H01M 4/42; H01M 4/50; H01M 4/62; H01M 6/045; H01M 50/414; H01M 50/451; H01M 50/457; H01M 50/489; H01M 50/446; Y02E 60/10
See application file for complete search history.

(56) References Cited

U.S. PATENT DOCUMENTS

| | | | |
|---|---|---|---|
| 2008/0268327 | A1 | 10/2008 | Gordon et al. |
| 2015/0104690 | A1 | 4/2015 | Xiao et al. |
| 2015/0364738 | A1* | 12/2015 | Pope ................... H01M 50/431 |
| | | | 429/231.95 |
| 2017/0093001 | A1* | 3/2017 | Kim ..................... H01M 4/8657 |
| 2018/0151861 | A1* | 5/2018 | Ryou ..................... H01M 12/08 |

FOREIGN PATENT DOCUMENTS

| | | | |
|---|---|---|---|
| CN | 104953071 A | | 9/2015 |
| KR | 20130139200 A | * | 12/2013 |
| WO | 2014168628 A1 | | 10/2014 |
| WO | 2016194872 A1 | | 12/2016 |
| WO | 2017062435 A1 | | 4/2017 |
| WO | 2019046575 A1 | | 3/2019 |

OTHER PUBLICATIONS

International Search Report and Written Opinion dated Dec. 24, 2018, for International Application No. PCT/US2018/048844, filed on Aug. 30, 2018.
First Examination Report dated Mar. 8, 2022, for India Application No. 202017013563, filed on Mar. 27, 2020.
First Office Action dated Apr. 1, 2022, for Chinese Application No. 201880065380.3, filed Aug. 30, 2018.
Second Office Action dated Sep. 9, 2022, for Chinese Application No. 201880065380.3, filed Aug. 30, 2018.
Decision of Rejection dated Jan. 13, 2023, for Chinese Application No. 201880065380.3, filed Aug. 30, 2018.
Notification of Reexamination Decision dated Nov. 27, 2023, for Chinese Application No. 201880065380.3, filed Aug. 30, 2018.
Reexamination Decision dated Jan. 22, 2024, for Chinese Application No. 201880065380.3, filed Aug. 30, 2018.
Hearing Notice dated May 2, 2024, for India Application No. 202017013563, filed on Mar. 27, 2020.
Office Action dated Feb. 26, 2024, for Korean Application No. 10-2020-7007667, filed Mar. 16, 2020.
Huang, Jinchao, et al., Ion Selective Membrane for Selective Ion Penetration in Alkaline Batteries, Chinese Application No. 202410486128.7 filed Apr. 22, 2024.

* cited by examiner

ION SELECTIVE MEMBRANE FOR SELECTIVE ION PENETRATION IN ALKALINE BATTERIES

CROSS-REFERENCE TO RELATED APPLICATIONS

This application is a filing under 35 U.S.C. 371 as the National Stage of International Application No. PCT/US2018/048844, filed on Aug. 30, 2018 and entitled, "ION SELECTIVE MEMBRANE FOR SELECTIVE ION PENETRATION IN ALKALINE BATTERIES," which claims the benefit of and claims priority to U.S. Provisional Application No. 62/552,780 filed Aug. 31, 2017 and entitled "Functionalized Graphene for Selective Ion Penetration in Alkaline Batteries", both of which are incorporated herein by reference in their entirety for all purposes.

STATEMENT REGARDING FEDERALLY FUNDED RESEARCH OR DEVELOPMENT

This invention was made with support from New York State Energy Research & Development Authority (NY-SERDA) under project number 58068. The government has certain rights in the invention.

BACKGROUND

Zinc-anode batteries, especially the alkaline zinc manganese dioxide ($Zn/MnO_2$) battery, have dominated the primary battery market since its invention. Currently, this chemistry is becoming attractive for large-scale energy storage applications because of the low cost and good safety characteristics of the basis material, as well as its high theoretical energy density. However, a typical primary $Zn/MnO_2$ battery usually accesses only the 1st electron capacity of $MnO_2$, and for rechargeable $Zn/MnO_2$ batteries, a high cycle-life is only achievable at reduced depth of discharge (DOD) around 10%-20%. Accessing higher DOD leads to detrimental phase transformation of the $MnO_2$ and zinc redistribution problem.

SUMMARY

The present application relates to methods for making separator membranes containing functionalized graphene and methods for making functionalized graphene modified electrodes. Alkaline batteries containing such composite membranes and electrodes are also described herein.

In an embodiment, the present application features a method that includes selecting a polymer as the matrix for the functionalized graphene. The method further includes dispersing the functionalized graphene homogeneously in the polymer matrix. The method further includes forming a composite membrane out of this mixture.

In an embodiment, the present application features a method that includes forming a membrane with the functionalized graphene monolayers stacked and overlapped on top of each other. The method further includes dispersing the monolayers in solvent. The step of forming the membrane includes vacuum assisted filtration, pressure assisted filtration, solution casting with air drying or vacuum drying, and forming the membrane at the air-water interface.

The method further includes coating the functionalized graphene membrane with hydrophilic polymers. The coated membrane has a sandwiched structure. The method further includes crosslinking of the membrane.

In an embodiment, the present application features a method that includes forming a membrane with laminated functionalized graphene monolayers and hydrophilic polymer chains. The method further includes dispersing the monolayers and polymers homogeneously in solvent. The step of forming the composite membrane includes vacuum assisted filtration, pressure assisted filtration, solution casting with air drying or vacuum drying, and forming the membrane at the air-water interface. The method further includes coating the functionalized graphene membrane with hydrophilic polymers. The coated membrane has a sandwiched structure. The method further includes crosslinking of the membrane.

In an embodiment, the present application features a method that includes selecting a metal or metal oxide or metal hydroxide or combinations thereof as the cathode material. The method further includes mixing the cathode material particles with functionalized graphene. The method further includes selecting a polymer as the binder, a carbon as the conductive matrix, mixing them with the functionalized graphene modified cathode material, and pasting the mixture onto a current collector. The method further includes directly coating the metal foil with one or a few layers of the functionalized graphene and using it as the cathode.

In an embodiment, the present application features a method that includes selecting a metal or metal oxide or metal hydroxide or combinations thereof as the anode material. The method further includes mixing the anode material particles with functionalized graphene. The method further includes selecting a polymer as the binder, a carbon as the conductive matrix, mixing them with the functionalized graphene modified anode material, and pasting the mixture onto a current collector. The method further includes directly coating the metal foil with one or a few layers of the functionalized graphene and using it as the anode.

In an embodiment, the present application features a method for making a battery comprising a cathode, an anode, and a separator disposed between the anode and the cathode. At least one of them is modified by the functionalized graphene.

These and other features will be more clearly understood from the following detailed description taken in conjunction with the accompanying drawings and claims.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

Figure 1:
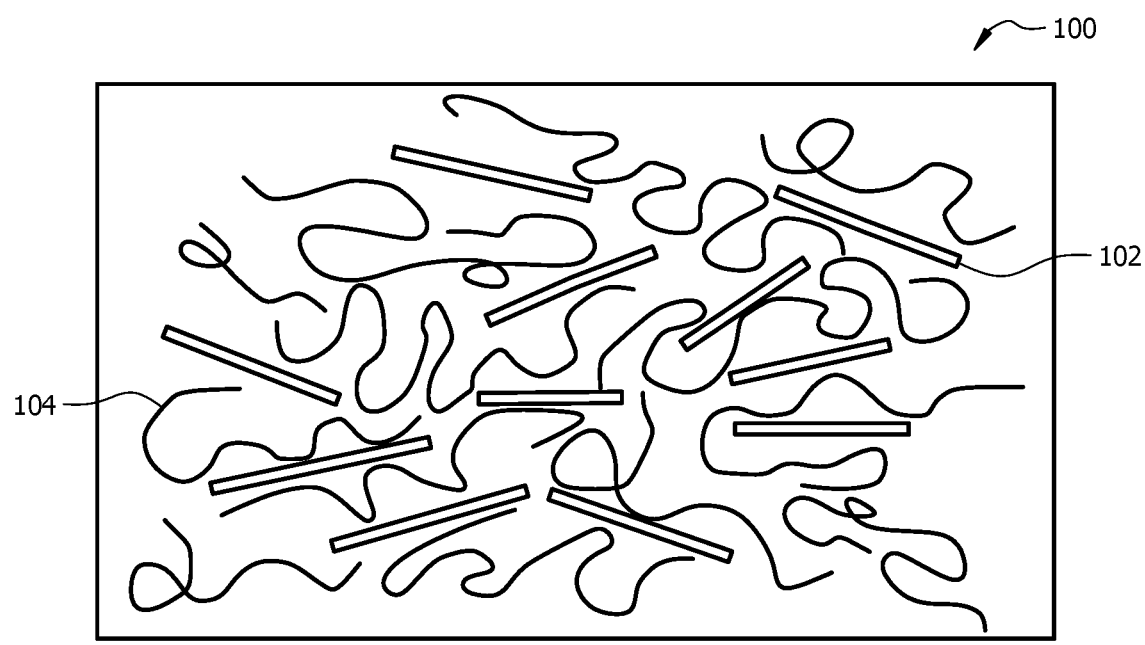
FIG. 1 is a schematic presentation of the type I membrane GO/PVA-I with graphene oxide monolayers.

The present systems and methods are best understood by reference to the detailed figure and description set forth herein.

Embodiments are discussed below with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise. As used herein, consisting essentially of allows for some minor amount of impurities that are present in the manufacturing of each recited component. For example, some amount of impurities of up to about 5% by weight, alternatively up to about 3% by weight, or alternatively up to about 1% by weight may be present in one or more of the listed elements of the mixture.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new claims may be formulated to such features and/or combinations of such features during the prosecution of the present Application or of any further Application derived therefrom.

In this disclosure, the terms "negative electrode" and "anode" are both used to mean "negative electrode." Likewise, the terms "positive electrode" and "cathode" are both used to mean "positive electrode." Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused.

The work described in this disclosure mainly relates to ion selective separator membranes containing functionalized graphene and electrodes modified with functionalized graphene for application in alkaline batteries. The disclosed use of the functionalized graphene can serve to reduce the accessibility of zincate ions to the cathode and prevent their poisoning effects.

A birnessite ($\delta$-$MnO_2$) material stabilized by $Cu^{2+}$ has been reported to deliver near-full two-electron capacity for more than 6,000 cycles in the absence of zinc. However, when paired with zinc anodes, the most detrimental effect during deep cycling arises from zincate ions ($[Zn(OH)_4]^{2-}$) that traverse to the cathode side and react to form a highly resistive and electrochemically inactive spinel phase, leading to rapid energy density loss and battery failure. Therefore, inhibiting the spinel phase formation remains a major challenge for both achieving higher capacity of a primary $Zn/MnO_2$ battery, and long-term cycling of an energy-dense secondary $Zn/MnO_2$ battery.

Prior works have tried a number of approaches to inhibit the spinel phase formation, such as adding alkaline earth metal compounds in the vicinity of $MnO_2$ to reduce the access of zincate ions, using LiOH or LiOH—KOH electrolyte to change the cathode discharge mechanism, and using ion exchange membranes to block zincate ions. As described herein, functionalized graphene can be used to endow the separator membranes and the electrodes with the capability of blocking (e.g., selectively blocking) zincate ions.

In some embodiments, an alkaline battery can comprise a separator having an ion selective material forming a portion thereof. The separator would generally be disposed between an anode and a cathode in the battery, and in some embodiment, the anode and/or the cathode can optionally comprise an ion selective component. In general, a separator can be disposed between the anode and the cathode when the electrodes are constructed into the battery. The separator forms an electrically insulating barrier between the anode and the cathode while being porous to hold the electrolyte and allow for ionic flow in the electrolyte between the electrodes. By being placed between the electrodes, the separator serves to prevent shorting that could occur due to direct electrical contact between the electrodes. As will be appreciated by one of skill in the art, the separator allows the electrolyte, or at least a portion and/or component thereof, to pass (e.g., cross, traverse, etc.) through the electrode separator membrane, to balance ionic flow and sustain the flow of electrons in the battery. In this regard, the separator serves to demarcate the cathode from the anode.

The ion selective material can be present in at least one layer in the separator. The ion selective material can be present as a layer in a membrane and/or present as a membrane in a stack of membranes that collectively form the separator. The ion selective material can comprise graphene, graphene oxide, reduced graphene oxide, functionalized graphene, or combinations thereof. The graphene can be functionalized with carboxyl, hydroxyl, epoxy oxygen functional groups, or other oxygen containing functional groups. In some embodiments, the graphene can be functionalized with hydrophilic functional groups.

Graphene or functionalized graphene is a two-dimensional single-layered material. Graphene oxide (GO), which is of special interest, can have functional groups such as carboxyl, hydroxyl, and/or epoxy oxygen functional groups attached on the basal plane and edges. It is usually obtained from complete exfoliation of graphite oxide in water. It is hydrophilic due to its oxygen-containing functional groups, and electrically insulated due to the $sp^2/sp^3$-hybridization.

GO sheets have shown promising properties working as a nanoscaled filler for nanocomposite materials as its oxygen containing groups impart strong intermolecular interactions between the GO sheet and polymer matrix, which significantly improves the thermal and mechanical properties of the nanocomposites. GO membranes are composed of stacked and overlapped GO monolayers with narrow interlayer spacing (~13.5 Å for GO laminates swelled in water), which can be excellent filters for gases and liquids. The nanocapillaries formed within the membranes as well as the oxygen functional groups which work as absorbents for heavy-metal ions are responsible for their ion sieving properties. As disclosed herein, separator membranes containing functionalized graphene and electrodes modified with the functionalized graphene are designed to block zincate ions and thus reduce their accessibility to $MnO_2$. Alkaline batteries with such membranes and electrodes are also described herein.

The ion selective material can be combined with a polymer in order to form an ion selective layer and/or an ion selective membrane. The resulting composite material can comprise a matrix of polymer with an ion selective material such as graphene and/or functionalized graphene disposed therein. Various degrees of mixing between the graphene and the polymer can be achieved in the ion selective material, which can vary the properties of the ion selective layer and/or membrane.

The resulting composite ion selective material can have a polymer to functionalized graphene material weight ratio between about 0.01:1 to 1000:1. At a high polymer to functionalized graphene material weight ratio, the composite ion selective material can have a structure in which the ion selective material such as a functionalized graphene material is dispersed in a polymer matrix of the polymer. As a result of the formation process, the functionalized graphene material can be homogenously distributed in the polymer matrix. At lower polymer to functionalized graphene material weight ratio, the composite ion selective material can have a structure in which graphene, graphene oxide, or functionalized graphene monolayers are laminated on top of each other, with or without polymer chains disposed in between. The resulting ion selective material can be formed in a layer having a thickness in the range from 1 nm to 1 mm.

Figure 2:
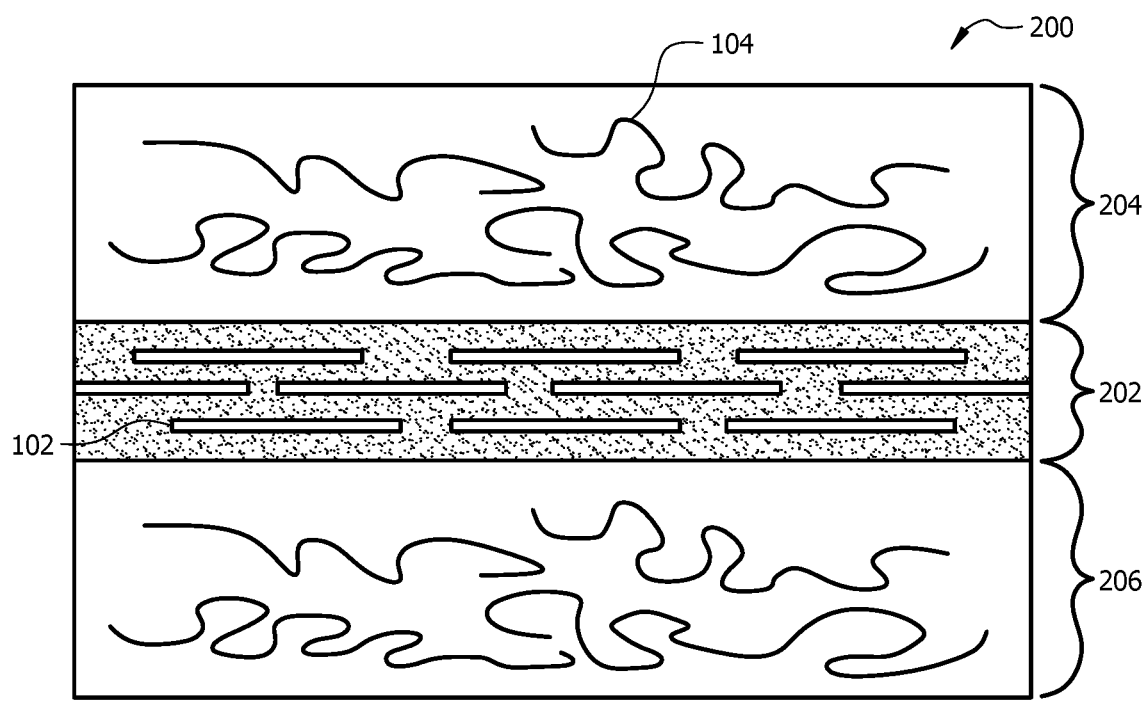
FIG. 2 is a schematic presentation of the sandwich-structured type II membrane GO/PVA-II with the middle layer being graphene oxide monolayers stacked and overlapped on top of each other, and the top and bottom layer being polymer layers.
Figure 3:
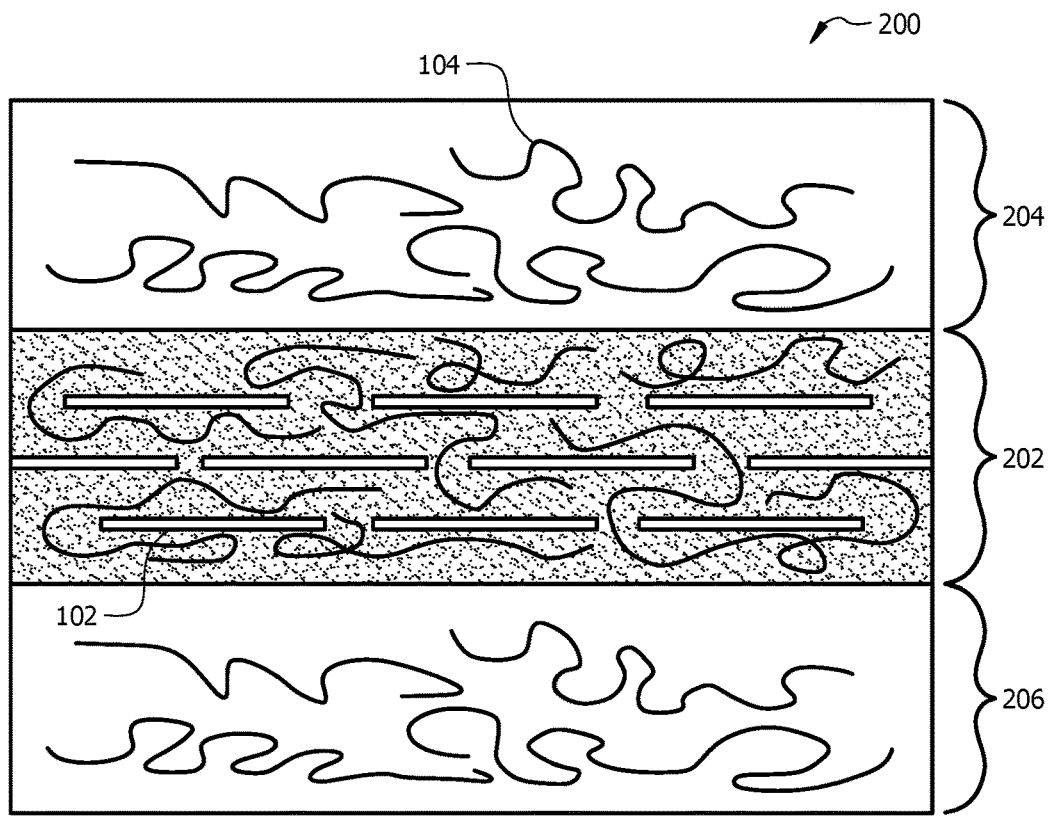
FIG. 3 is a schematic presentation of the sandwich-structured type III membrane GO/PVA-III with the middle layer being laminated graphene oxide monolayers and polymer chains, and the top and bottom layer being polymer layers.

The resulting structures are shown schematically in FIGS. 1 to 3. As shown in FIG. 1, the polymer 104 and the ion selective material 102 can be initially formed as a mixture, as described in more detail herein. The ion selective layer can then be formed as either a pure ion selective material layer or as a layer having the ion selective material with polymer disposed therein. As shown in FIG. 1, the resulting composite ion selective material layer 100 can comprise a mixture of the ion selective material and polymer chains in a random orientation. As shown in FIG. 2, the ion selective membrane 200 can comprise an ion selective layer 202 having sheets of ion selective material 102 layered or stacked to form the ion selective layer 202. The use of certain formation techniques such as vacuum assisted filtration can be used to help align and orient the ion selective material within the ion selective layer 202. One or more additional layers of polymer 204, 206 can be disposed on the ion selective layer 202 in some embodiments. When two layers 204, 206 are present, the selection of the polymer or polymer mixture used, the thickness of the layer, and/or properties of each layer 204, 206 can be the same or different. In some embodiments, one or more cross-linkers can be used to cross-link the ion selective layer 202 and/or one or more of the polymer coating layers 204, 206.

An alternative ion selective membrane 300 is shown in FIG. 3. As shown, the composite ion selective layer 302 can comprise the ion selective material 102 having the polymer chains 104 from the mixture disposed therebetween to form a composite material. One or more layers of polymer 304, 306 can be optionally disposed on one or more sides of the ion selective material layer 302. When two layers 304, 306 are present, the selection of the polymer or polymer mixture used, the thickness of the layer, and/or properties of each layer 304, 306 can be the same or different. As shown in FIG. 3, the inclusion of the polymer chains 104 in between the layers of the ion selective material 102 in the composite ion selective layer can increase the layer spacing. For example, the inclusion of the polymer in between sheets of graphene, graphene oxide, and/or functionalized graphene can serve to increase the spacing of the graphene sheets. The use of pure graphene, graphene oxide, and/or functionalized graphene may have a base interlayer spacing of around 8 angstroms (Å). The inclusion of polymers in the ion selective layer may increase the layer spacing to about 15 Å, about 20 Å, or in some instances a larger interlayer spacing. Thus, the selection of the polymer as well as the ratio of polymer to ion selective material allows for control of the interlayer spacing within the ion selective layer and/or membrane. This in turn can be used to control the selectivity of the composite ion selective layer and/or membrane.

The ion selective membrane can include the ion selective material as at least one layer. In addition to the ion selective layer, one or more layers of polymer can be coated on the ion selective material layer to impart strength and durability during use in a battery. The polymers used in the ion selective layer and/or the additional layers can include, but are not limited to, poly(vinyl alcohol), poly(acrylic acid), carboxymethyl cellulose, polypropylene, polyethylene, poly(vinyl chloride), poly(tetrafluoroethylene) or combinations thereof.

A cross-linker can be included in the polymer layer and/or as a separate layer to cross-link one or more of the ion selective layer, the polymer layers, or any combination thereof. Various cross-linkers can be used based on the selection of the polymer or polymers. For example, the cross-linking agent can include glutaric dialdehyde, though additional cross-linking agents may be selected based on the composition of the polymers used. The use of a cross-linking agent to provide a cross-linked polymer in the ion selective layer or membrane may provide stability in the interlayer spacing of the ion selective material during use, thereby retaining the ion selectivity.

The layer of the ion selective material can be applied alone or combined with one or more non-selective separator membrane materials. In some embodiments, the various materials and layers can be present as a single integrated separator membrane, or separate membranes can be applied in series between the electrodes. In some embodiments, the non-selective membrane or non-selective material layers can comprise nonwoven materials or polymer films fabricated from nylon, polyester, polyethylene, polypropylene, poly (tetrafluoroethylene) (PTFE), poly(vinyl chloride) (PVC), polyvinyl alcohol, cellulose, or any combinations thereof.

The ion selective membrane can be produced using a variety of methods. In some embodiments, the ion selective membrane can be formed using a dispersion process. In this process, a polymer can be dispersed into a solvent to form a polymer dispersion. The ion selective material such as graphene, graphene oxide, and/or a functionalized graphene can be dispersed into the polymer/solvent mixture. In some embodiments, the polymer can be combined with a solvent and the ion selective material can be separately combined with a solvent, and the two resulting mixtures can be combined. The materials can be mixed to form a mixture. In some embodiments, the mixing can result in a homogenous mixture. The mixture can then be processed using a number of techniques to remove the solvent and form the ion selective material as a layer and/or as a separate membrane. Subsequent steps can be used to coat the ion selective layer with one or more layers of polymer depending on the final desired structure.

The polymer used in the mixture can include any of those polymers described above, including at least poly(vinyl alcohol), poly(acrylic acid), carboxymethyl cellulose, polypropylene, polyethylene, poly(vinyl chloride), poly(tetrafluoroethylene) or combinations thereof. While a specific list of polymers is included, other suitable polymers than can be dispersed in a solvent can also be used.

The solvent used in the dispersion process can be any solvent suitable for dispersing both the polymer and the ion selective material. When a hydrophilic ion selective membrane is desired, a polar solvent such as water, an organic solvent, or a combination thereof can be used, though other suitable solvents are available. The ion selective material can include any of those materials described herein.

The mixing step can be carried out in a manner sufficient to mix the ion selective material with the polymer. In some embodiments, the step of dispersing the polymer comprises stirring, ultrasonication, and/or vibration mixing. When a uniform structure is desired, the mixing may be sufficient to form a homogenous mixture such that upon forming the ion selective layer, the ion selective material can have the polymer disposed between the material. For example, the ion selective layer can comprise polymer chains disposed between sheets of graphene, graphene oxide, and/or functionalized graphene.

The degree to which the polymer can be disposed between the ion selective material may depend in part upon the ratio of the polymer to the ion selective material. In some embodiments, the polymer dispersion can be formed and can contain between about 1% to about 99% of the polymer. The ion selective material can be included within the dispersion in an amount of between about 0.1% to about 10% by weight.

Once the dispersion is mixed, the ion selective layer and/or membrane can be formed by selectively removing the solvent from the mixture. In some embodiments, the composite ion selective layer and/or membrane can be formed through vacuum assisted filtration, pressure assisted filtration, solution casting with air drying or vacuum drying, spin coating, or forming the membrane at the air-liquid interface. The resulting layer can have a ratio of the polymer to the ion selective material as disclosed above.

Subsequent to forming the ion selective layer or membrane, the composite ion selective membrane can be coated with one or more layers of polymers. The one or more layers of polymer can include any of those polymers described herein including, but not limited to, poly(vinyl alcohol), poly(acrylic acid), carboxymethyl cellulose, polypropylene, polyethylene, poly(vinyl chloride), poly(tetrafluoroethylene) or combinations thereof. In some embodiments, a cross-linker can be used to coat one or more of the layers of the polymer and/or the ion selective layer and/or membrane. In some embodiments, a cross-linker can be used to incorporated into the one or more of the layers of the polymer and/or the ion selective layer and/or membrane at the time of formation to effectively cross-link the one or more of the layers of the polymer and/or the ion selective layer and/or membrane.

Figure 4:
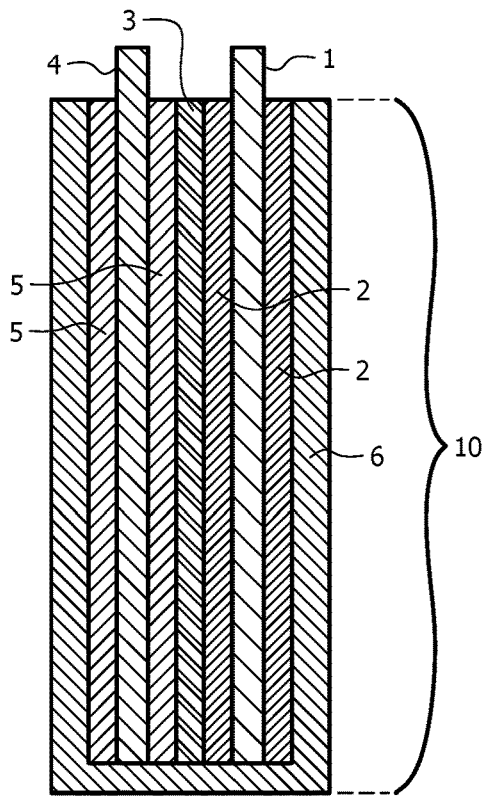
FIG. 4 is a cross section view of an embodiment of the battery in a prismatic arrangement.
Figure 5:
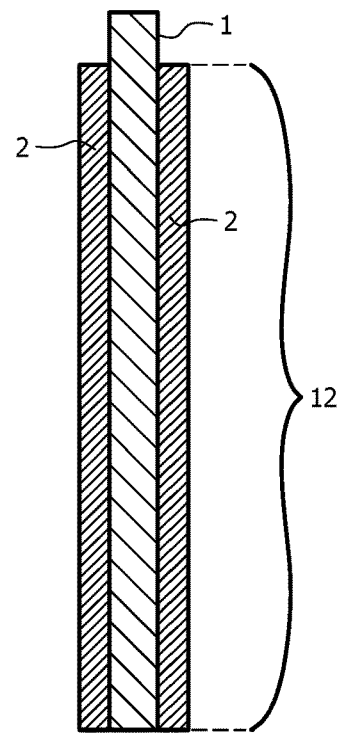
FIG. 5 is a cross section view of an embodiment of the positive electrode or cathode of the battery in a prismatic arrangement.

In some embodiments, the ion selective layer and/or membrane can be used in a separator of a battery. Referring to FIGS. 4 and 5, a battery 10 has a housing 6, a cathode current collector 1, a cathode material 2, a separator 3, an anode current collector 4, and an anode material 5. FIG. 4 shows a prismatic battery arrangement. In another embodiment, the battery can be a cylindrical battery. An electrolyte can be dispersed in an open space throughout battery 10. Referring to FIG. 5, the cathode current collector 1 and cathode material 2 are collectively called either the cathode 12 or the positive electrode 12. Similarly, the anode current collector 4 and the anode material 5 are collectively called either the anode or the negative electrode.

The cathode 12 can comprise a mixture of components including an electrochemically active material, a binder, a conductive material, and one or more additional components that can serve to improve the lifespan, rechargeability, and electrochemical properties of the cathode 12. In some embodiments, the cathode can comprise an ion selective material, including any of those described herein. The cathode 12 can be incorporated into the battery 10 which may be a secondary battery. The active cathode material can based on one or many polymorphs of $MnO_2$, including electrolytic (EMD), $\alpha$-$MnO_2$, $\beta$-$MnO_2$, $\gamma$-$MnO_2$, $\delta$-$MnO_2$, $\varepsilon$-$MnO_2$, or $\lambda$-$MnO_2$. Other forms of $MnO_2$ can also be present such as pyrolusite, ramsdellite, nsutite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide, zinc manganese dioxide. Other active components can be present in place of or in addition to $MnO_2$ such as nickel, nickel oxyhydroxide, nickel hydroxide, silver, silver oxide, copper, copper hydroxide, lead, lead hydroxide, lead oxide, and a combination thereof. In general the cycled form of manganese dioxide in the cathode is can have a layered configuration, which in some embodiment can comprise $\delta$-$MnO_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the $MnO_2$ second electron stage (e.g., between about 20% to about 100% of the $2^{nd}$ electron capacity of the cathode) may be performed and subsequently recharging back to its $Mn^{4+}$ state, resulting in birnessite-phase manganese dioxide.

The addition of a conductive additive such as conductive carbon enables high loadings of $MnO_2$ in the mixed material, resulting in high volumetric and gravimetric energy density. The conductive carbon can be present in a concentration between about 1-30 wt %. Such conductive carbon include single walled carbon nanotubes, multiwalled carbon nanotubes, graphene, carbon blacks of various surface areas, and others that have specifically very high surface area and conductivity. Higher loadings of the $MnO_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), carbon nanotubes plated with metal like nickel and/or copper, graphene, graphyne, graphene oxide, Zenyatta graphite, and combinations thereof. The birnessite discharge reaction comprises a dissolution-precipitation reaction where $Mn^{3+}$ ions become soluble and precipitate out on the conductive carbon as $Mn^{2+}$. This second electron process involves the formation of a non-conductive manganese hydroxide [$Mn(OH)_2$] layer on the conductive graphite.

The conductive additive can have a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. In some embodiments, the mass ratio of graphite to the conductive additive can range from about 5:1 to about 50:1, or from about 7:1 to about 28:1. The total carbon mass percentage in the cathode paste can range from about 5% to about 30% or between about 10% to about 20%.

The addition of a conductive component such as metal additives to the mixed material cathode may be accomplished by addition of one or more metal powders such as nickel powder to the cathode mixture. The conductive metal component can be present in a concentration of between about 0-30 wt %. The conductive metal component may be, for example, nickel, copper, silver, gold, tin, cobalt, antimony, brass, bronze, aluminum, calcium, iron or platinum. In one embodiment, the conductive metal component is a powder. In one embodiment, a second conductive metal component is added to act as a supportive conductive backbone for the first and second electron reactions to take place. The second electron reaction has a dissolution-precipitation reaction where $Mn^{3+}$ ions become soluble in the electrolyte and precipitate out on the graphite resulting in an electrochemical reaction and the formation of manganese hydroxide [$Mn(OH)_2$] which is non-conductive. This ultimately results in a capacity fade in subsequent cycles. Suitable second component include transition metals like Ni, Co, Fe, Ti and metals like Ag, Au, Al, Ca. Salts or such metals are also suitable. Transition metals like Co also help in reducing the solubility of $Mn^{3+}$ ions. Such conductive metal components may be incorporated into the electrode by chemical means or by physical means (e.g. ball milling, mortar/pestle, spex mixture). An example of such an electrode comprises 5-95% birnessite, 5-95% conductive carbon, 0-50% second conductive metal component and 1-10% binder.

In some embodiments a binder can be used. The binder can be present in a concentration of between about 0-10 wt %. In some embodiments, the binder comprises water-soluble cellulose-based hydrogels, which were used as thickeners and strong binders, and have been cross-linked with good mechanical strength and with conductive polymers. The binder may also be a cellulose film sold as cellophane. The binders were made by physically cross-linking the water-soluble cellulose-based hydrogels with a polymer through repeated cooling and thawing cycles. In one embodiment, 0-10 wt. % carboxymethyl cellulose (CMC) solution was cross-linked with 0-10 wt. % polyvinyl alcohol (PVA) on an equal volume basis. The binder, compared to the traditionally-used TEFLON®, shows superior performance. TEFLON® is a very resistive material, but its use in the industry has been widespread due to its good rollable properties. This, however, does not rule out using TEFLON® as a binder. Mixtures of TEFLON® with the aqueous binder and some conductive carbon were used to create rollable binders. Using the aqueous-based binder helps in achieving a significant fraction of the two electron capacity with minimal capacity loss over many cycles. In one embodiment, the binder is water-based, has superior water retention capabilities, adhesion properties, and helps to maintain the conductivity relative to an identical cathode using a TEFLON® binder instead. Examples of hydrogels include methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC). Examples of crosslinking polymers include polyvinyl alcohol, polyvinylacetate, polyaniline, polyvinylpyrrolidone, polyvinylidene fluoride and polypyrrole. In one such embodiment, a 0-10 wt % solution of water-cased cellulose hydrogen is cross linked with a 0-10% wt solution of crosslinking polymers by, for example, repeated freeze/thaw cycles, radiation treatment or chemical agents (e.g. epichlorohydrin). The aqueous binder may be mixed with 0-5% TEFLON® to improve manufacturability.

Additional elements can be included in the cathode material including a bismuth compound and/or copper/copper compounds, which together allow improved galvanostatic battery cycling of the cathode. The bismuth compound can be incorporated into the cathode 12 as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between about 1-20 wt %. Examples of inorganic bismuth compounds include bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth.

The copper compound can be incorporated into the cathode 12 as an organic or inorganic salt of copper (oxidation states 1, 2, 3 or 4), as a copper oxide, or as copper metal (i.e., elemental copper). The copper compound can be present in a concentration between about 1-70 wt %. In one embodiment, the copper compound is present in a concentration between about 5-50 wt %. In another embodiment, the copper compound is present in a concentration between about 10-50 wt %. In yet another embodiment, the copper compound is present in a concentration between about 5-20 wt %. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which will not withstand galvanostatic cycling.

In some embodiments, the cathode material can also comprise an ion selective material, including any of those described herein. The ion selective material can be useful in limiting the migration of zincate ions that reach the cathode into the cathode material. The ion selective material can be incorporated into the cathode mixture prior to formation of the cathode such that the ion selective material is uniformly distributed into the cathode materials. In some embodiments, the ion selective material can be formed as a layer on the exterior of the cathode, or additionally or alternatively, as one or more layers within the cathode itself.

The cathodes 12 can be produced using methods implementable in large-scale manufacturing. The cathode 12 can be capable of delivering the full second electron capacity of 617 mAh/g of the $MnO_2$. Excellent rechargeable performance can be achieved for both low and high loadings of $MnO_2$ in the mixed material, allowing the cell/battery to achieve very high practical energy densities. In some embodiments, the cathode material can comprises 2-30% wt conductive carbon, 0-30% conductive metal additive, 1-70% wt. copper compound, 1-20% wt bismuth compound, 0-10% wt binder and birnessite or EMD. In another embodiment the cathode material comprises 2-30% wt conductive carbon, 0-30% conductive metal additive, 1-20% wt bismuth compound, 0-10% wt binder and birnessite or EMD. In one embodiment, the cathode material consists essentially of 2-30% wt conductive carbon, 0-30% conductive metal additive, 1-70% wt. copper compound, 1-20% wt bismuth compound, 0-10% wt binder and the balance birnessite or EMD. In another embodiment the cathode material consists essentially of 2-30% wt conductive carbon, 0-30% conductive metal additive, 1-20% wt bismuth compound, 0-10% wt binder and the balance birnessite or EMD.

The resulting cathode may have a porosity in the range of 20%-85% as determined by mercury infiltration porosimetry. In one embodiment, the porosity is measured according to ASTM D4284-12 "Standard Test Method for Determining Pore Volume Distribution of Catalysts and Catalyst Carriers by Mercury Intrusion Porosimetry."

The cathode paste can be formed on a current collector formed from a conductive material that serves as an electrical connection between the cathode material and an external electrical connection or connections. In some embodiments, the cathode current collector can be, for example, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, half nickel and half copper, or any combination thereof. The cathode current collector may be formed into a mesh (e.g., an expanded mesh, woven mesh, etc.), perforated metal, foam, foil, perforated foil, wire screen, a wrapped assembly, or any combination thereof. In some embodiments, the current collector can be formed into or form a part of a pocket assembly. A tab can be coupled to the current collector to provide an electrical connection between an external source and the current collector.

The battery can also comprise an anode having an anode material in electrical contact with an anode current collector. In some embodiments, the anode material can comprise zinc, which can be present as elemental zinc and/or zinc oxide. In some embodiments, the Zn anode mixture comprises Zn, zinc oxide (ZnO), an electronically conductive material, and a binder. An ion selective material may also be present in the anode mixture in some embodiments. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. In an embodiment, Zn may be present in an amount of about 85 wt. %, based on the total weight of the anode material. Additional elements that can be in the anode in addition to the zinc or in place of the zinc include, but are not limited to, lithium, aluminum, magnesium, iron, cadmium and a combination thereof.

In some embodiments, ZnO may be present in an amount of from about 5 wt. % to about 20 wt. %, alternatively from about 5 wt. % to about 15 wt. %, or alternatively from about 5 wt. % to about 10 wt. %, based on the total weight of anode material. In an embodiment, ZnO may be present in anode material in an amount of about 10 wt. %, based on the total weight of the anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be present in the anode material in an amount of from about 5 wt. % to about 20 wt. %, alternatively from about 5 wt. % to about 15 wt. %, or alternatively from about 5 wt. % to about 10 wt. %, based on the total weight of the anode material. In an embodiment, the electrically conductive material may be present in anode material in an amount of about 10 wt. %, based on the total weight of the anode material. As will be appreciated by one of skill in the art, and with the help of this disclosure, the electrically conductive material is used in the Zn anode mixture as a conducting agent, e.g., to enhance the overall electric conductivity of the Zn anode mixture. Nonlimiting examples of electrically conductive material suitable for use in in this disclosure include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof The anode material may also comprise a binder. Generally, a binder functions to hold the electroactive material particles (e.g., Zn used in anode, etc.) together and in contact with the current collector. The binder is present in a concentration of 0-10 wt %. The binders may comprise water-soluble cellulose-based hydrogels like methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), which were used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be TEFLON®, which is a very resistive material, but its use in the industry has been widespread due to its good rollable properties.

In some embodiments, the binder may be present in anode material in an amount of from about 2 wt. % to about 10 wt. %, alternatively from about 2 wt. % to about 7 wt. %, or alternatively from about 4 wt. % to about 6 wt. %, based on the total weight of the anode material. In an embodiment, the binder may be present in anode material in an amount of about 5 wt. %, based on the total weight of the anode material.

In some embodiments, the anode material can also comprise an ion selective material, including any of those described herein. The ion selective material can be useful in limiting the migration of zincate ions out of the anode material. The ion selective material can be incorporated into the anode mixture prior to formation of the anode such that the ion selective material is uniformly distributed into the anode materials. In some embodiments, the ion selective material can be formed as a layer on the exterior of the anode, or additionally or alternatively, as one or more layers within the anode itself.

A current collector can be used with an anode, including any of those described with respect to the cathode. The anode material can be pressed onto the anode current collector to form the anode. For example, the anode and/or the cathode materials can be adhered to a corresponding current collector by pressing at, for example, a pressure between 1,000 psi and 20,000 psi (between $6.9 \times 10^6$ and $1.4 \times 10^8$ Pascals). The cathode and anode materials may be adhered to the current collector as a paste. A tab of each current collector, when present, can extend outside of the device to form the current collector tab.

An alkaline electrolyte (e.g. an alkaline hydroxide, such as NaOH, KOH, LiOH, or mixtures thereof) can be contained within the free spaces of the electrodes. In some embodiments, the electrolyte can comprise an acidic solution, alkaline solution, ionic liquid, organic-based, solid-phase, gelled, etc. or combinations thereof that conducts lithium, magnesium, aluminum and zinc ions. Examples include chlorides, sulfates, sodium hydroxide, potassium hydroxide, lithium hydroxide, perchlorates like lithium perchlorate, magnesium perchlorate, aluminum perchlorate, lithium hexafluorophosphate, $[M^+][AlCl^{4-}](M^+)]$-sulphonyl chloride or phosphoryl chloride cations, 1-ethyl-3-methylimidazolium bis (trifluoromethylsulfonyl)imide, 1-ethyl-3-methylimidazolium trifluoromethanesulfonate, 1-butly-1-methylpyrrolidinium bis(trifluoromethylsulfonyl)imide,1-hexyl-3-methylimidazolium hexofluorophosphate,1-ethyl-3-methylimidazolium dicyanamide,11-methyl-3-octylimidazolium tetrafluoroborate, yttria-stabilized zirconia, beta-alumina solid, polyacrylamides, NASICON, lithium salts in mixed organic solvents like 1,2-dimethoxyethane, propylene carbonate, magnesium bis(hexamethyldisilazide) in tetrahydrofuran and a combination thereof. The electrolyte may have a concentration of between 5 wt % and 60 wt %. The battery base electrolyte may comprise an acidic electrolyte, zinc sulfate or zinc chloride. The pH of the electrolyte can vary from 0-15. The electrolyte can be in a liquid or gelled form. When the electrolyte is in the form of a gel, the gelled electrolyte can be formed by mixing a cellulose derivative and an alkaline solution.

In some embodiments, one or more additives can be used in the electrolyte, the anode, or the cathode to control gassing during cycling of the battery. For example, bismuth, indium, indium acetate, phosphate esters, or any combination thereof can be added to the electrodes and/or electrolyte.

A separator can be disposed between the anode and the cathode when the electrodes are constructed into the battery. The separator 3 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 3 can comprise a CELGARD® brand microporous separator. In an embodiment, the separator 3 can comprise a FS 2192 SG membrane, which is a polyolefin nonwoven membrane commercially available from Freudenberg, Germany.

The separator can comprise at least one layer of ion selective material as described herein. For example, the separator can comprise an ion selective material formed as a layer within of the separator layers or as a freestanding layer. In some alternative embodiments, the electrodes (e.g., the anode and/or the cathode) can comprise the ion selective material layers and the separator 3 may be free of an ion selective material or layer.

In some embodiments, a water-insoluble hydroxide layer can be formed and used as a layer of the separators. The water-insoluble hydroxide layer can be formed from a hydroxide of calcium, magnesium, barium, strontium and a combination thereof. A binder can be used in the water-insoluble hydroxide layer to allow the layer to be freestanding and formed as a film used as a layer of the separator.

Once constructed, the battery can be cycled during use. An initial conditioning step can be used to improve the life and cycling properties of the battery. During the initial cycling step, a layered structure of the $MnO_2$ can be formed by cycling into at least a portion of the second electron capacity of the cathode. For example, a birnessite-phase $MnO_2$ can be synthesized in situ by beginning with electrolytic manganese dioxide (EMD) in the mixed material and performing a formation step by discharging to the cathode to within the $2^{nd}$ electron capacity (617 mAh/g-$MnO_2$ or the $Mn^2$ state) and recharging back to the $Mn^{4+}$ state, resulting in a layered $MnO_2$ structure having one or more additives incorporated therein (e.g., a birnessite-phase manganese dioxide ($\delta$-$MnO_2$) having one or more of the included additives included therein). The batteries described herein can be operated by discharging and charging the cells a plurality of times.

During cycling, the ion selective layer within the battery can serve to mitigate or limit the diffusion or movement of zincate ions from the anode to the cathode. Specifically, the zincate ions can diffuse from the anode to the cathode in the absence of a ion selective barrier. The zincate ions can then react with the cathode materials to form insoluble components that can reduce the capacity of the cathode, eventually resulting in failure of the battery. The presence of the ion selective material can serve to prevent or limit the zincate ion transport from the anode to the cathode through the electrolyte during operation of the battery. This can limit the formation of insoluble components at the cathode, thereby preventing or limiting degradation of the performance of the battery over time. This may allow for increased capacity and lifetime (e.g., number of available cycles before failure) of the battery.

The following examples are given as particular embodiments of the disclosure and to demonstrate the practice and advantages thereof. It is understood that the examples are given by way of illustration and are not intended to limit the specification or the claims in any manner.

Example 1

A 5 wt % PVA solution was prepared by dissolving solid polyvinyl alcohol (PVA) (Sigma Aldrich) into deionized water with continuous stirring at 90° C. Graphene oxide water dispersion (4 mg/mL) was first diluted to 1 mg/mL with ultrasonication. The dispersion was then added to 5 wt % PVA solution drop by drop under vigorous stirring until a homogenous dispersion was obtained. The resulting GO/PVA dispersion was then cast onto a Teflon tray and kept at room temperature for film formation. A brown colored film was peeled off the tray after drying. The weight ratio of PVA and GO can be controlled during membrane fabrication, and membranes with different GO contents can be obtained. The thickness of the film can be altered by changing the amount of the casting solution. Membrane fabricated with this method is denoted as GO/PVA-I. Its structure is shown in FIG. 1.

Example 2

In a second example, 12.5 mL of as purchased graphene oxide water dispersion (4 mg/mL) was diluted with deionized water to 1 mg/mL with ultrasonication. 0 mg, 50 mg, and 100 mg PVA (Sigma Aldrich) was dissolved in 50 mL deionized water at 90° C. respectively, in order to achieve different PVA contents. The composite GO/PVA solution was prepared by adding the diluted GO dispersion dropwise to the PVA solution. The laminated PVA/GO membrane was then prepared with vacuum-assisted self-assembly by filtering the composite GO/PVA solution through a microfiltration apparatus equipped with a fritted-glass support and a polycarbonate filter membrane. A flexible freestanding GO/PVA composite film could be easily peeled off the filter membrane after drying. The as fabricated film was then coated with 5 wt % PVA solution containing glutaric dialdehyde as the crosslinking agent to achieve a sandwiched structure. The membrane as shown in FIG. 2 was denoted as GO/PVA-II, with the middle layer being graphene oxide monolayers stacked and overlapped on top of each other, and the membrane shown in FIG. 3 is denoted as GO/PVA-III, with the middle layer being laminated graphene oxide monolayers and PVA chains.

Example 3

Figure 6:
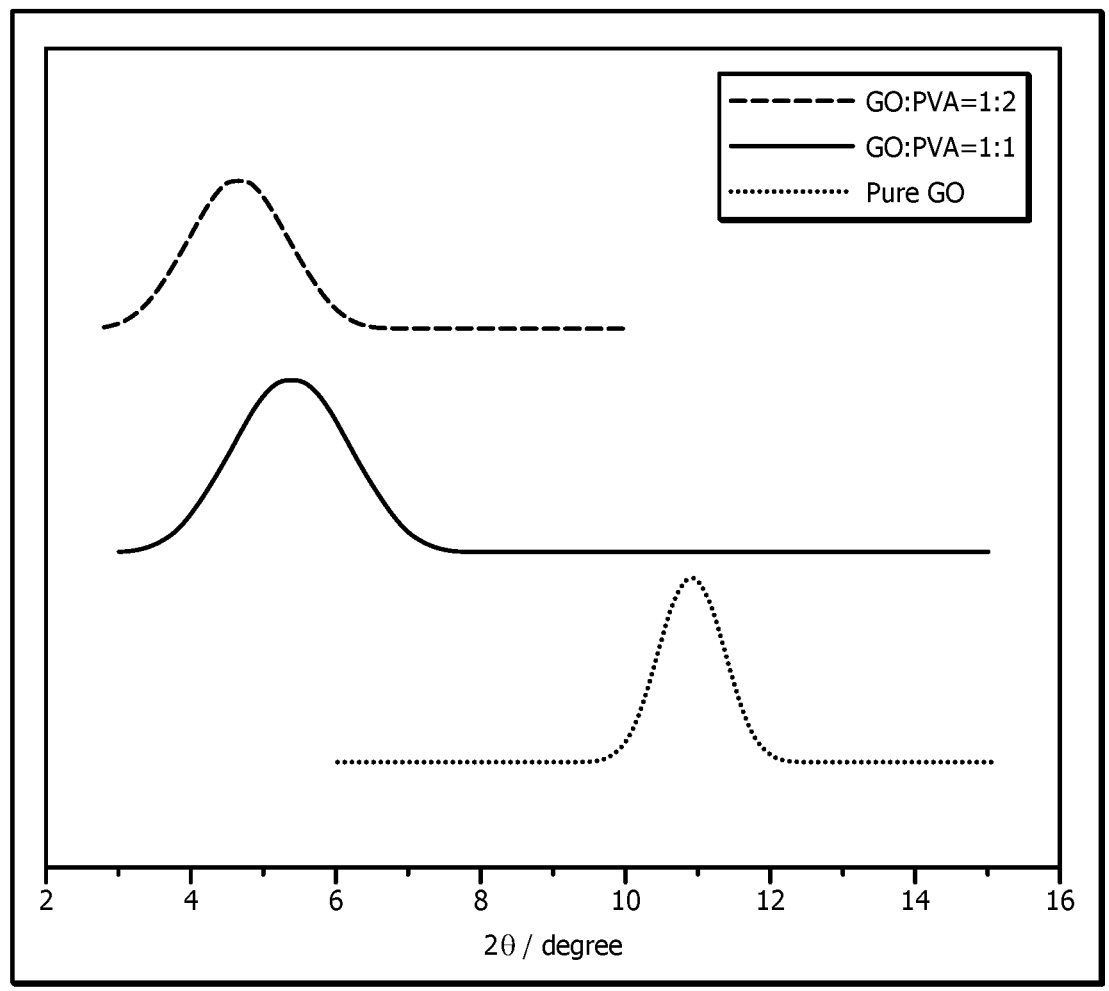
FIG. 6 is a graph illustrating XRD patterns of laminated GO/PVA membranes with different PVA contents.

X-ray diffraction (XRD) tests were conducted on the three membranes with different PVA contents in order to see the PVA polymer's effect in the interlayer spacing change of the graphene oxide monolayers. The XRD patterns are shown in FIG. 6. The membrane with pure GO shows a peak at around $2\theta=11°$. The interlayer spacing as calculated by the Bragg's law was about 8 Å. The addition of PVA polymers enlarged the spacing between each two monolayer of the GO. The membrane with a weight ratio of GO/PVA=1:1 increased the distance to about 16 Å, and the membrane with a weight ratio of GO/PVA=1:2 increased the distance to about 19 Å. The wider peak shows that PVA also induced a lager variation in the interlayer spacing.

Example 4

Figure 7:
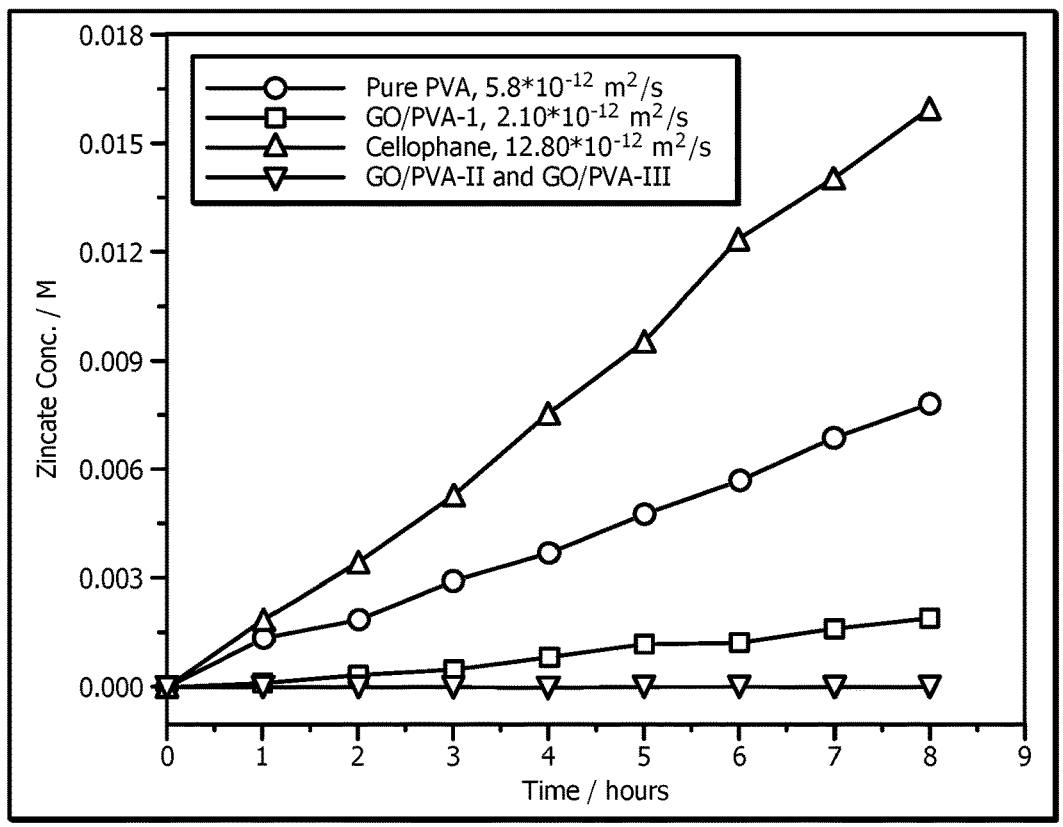
FIG. 7 is a graph illustrating permeation test results showing cross-over of zincate ions through different separators with elapsed time.

The concentration gradient-driven transport of zincate ions through different separators was investigated by a two chamber diffusion cell with a separator placed in between. One compartment of the cell was filled with 25 wt % KOH solution containing 0.45M zincate, and the other with 25 wt % KOH solution with no zincate. Both compartments were continuously stirred. Samples were regularly taken from the initially no zincate side for zincate concentrations measurements. The cross-overs of zincate ions vs. elapsed time are shown in FIG. 7. It is apparently shown that the conventionally used separator material cellophane shows highest permeability to zincate ions, which is more than twice of the pure PVA and five times higher than GO/PVA-I. It is also noticed that the zincate ion permeations through the laminated GO/PVA membranes (GO/PVA-II and GO/PVA-III) are almost completely blocked for the time period of the two-chamber diffusion test, which shows very promising potential for applications in batteries to block the zincate ions.

Example 5

Two primary cells were assembled to test different membranes' performances. Each cell had a $MnO_2$ cathode and a Zn anode. The cathode was a mixture of electrolytic $\gamma\text{-}MnO_2$ (EMD) and multiwall carbon nanotubes. The anode was a mixture of Zn, ZnO, and Teflon. Each anode was wrapped with one layer of cellophane, and the electrolyte was 25% KOH. In one cell, the cathode was wrapped with one layer of cellophane, and in the other, the cathode was wrapped with one layer of GO/PVA-III.

Figure 8:
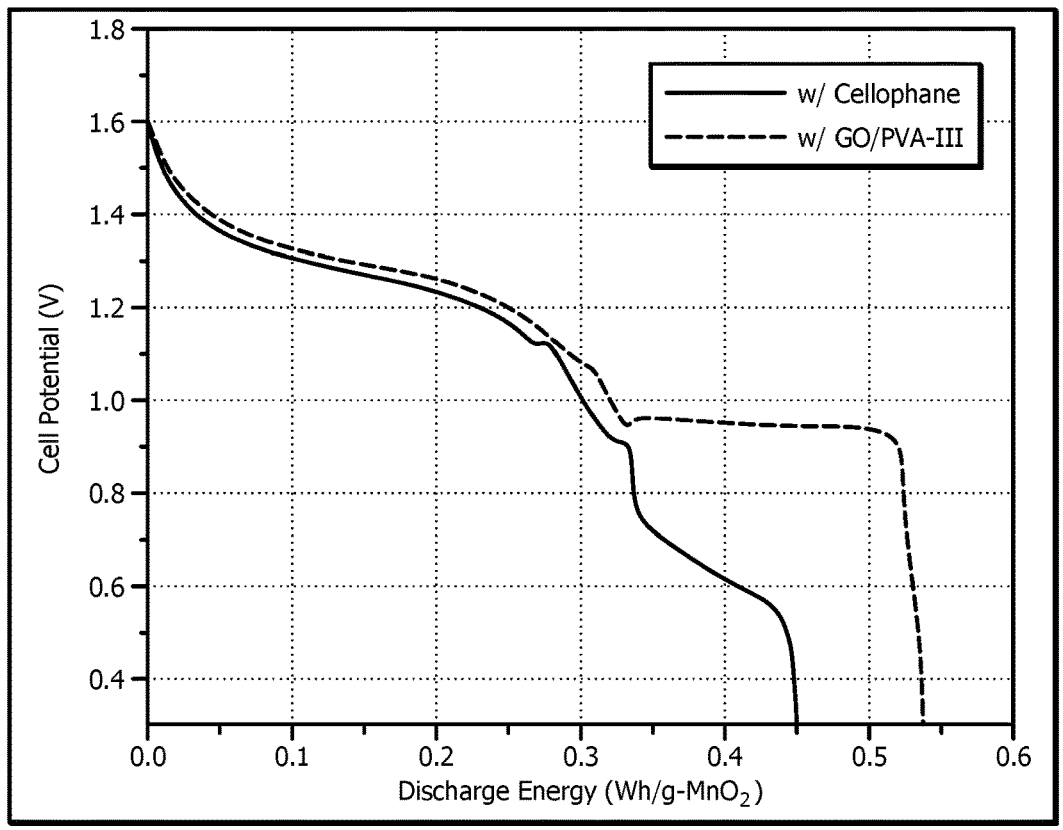
FIG. 8 is a graph illustrating discharge voltage vs. discharge capacity curves of primary alkaline $Zn/MnO_2$ cells with different membranes.

FIG. 8 shows the cell's discharge voltage change with discharged capacity. The double sigmoid shape above 0.9V represents the first electron reduction of $MnO_2$ as shown in equation [1], which is a homogenous reaction leading to the formation of MnOOH. The plateau at ~0.9V represents the second electron reduction of $MnO_2$ as shown in equation [2] and [3], which has dissolution and precipitation mechanism. This plateau is always brief or even disappears with the presence of zincate ions, as the highly resistive and inactive material $ZnMn_2O_4$ starts to form and accumulate, thus leading to conductivity loss and pore close of the electrode. It is apparent from FIG. 8 that the cell with a GO/PVA-III membrane was able to achieve capacity from the second electron, while the cell with cellophane lost the characteristic plateau completely.

$$MnO_2 + H_2O + e^- \rightarrow MnOOH + OH^- \quad [1]$$

$$MnOOH + H_2O + 3OH^- \rightarrow [Mn(OH)_6]^{3-} \quad [2]$$

$$[Mn(OH)_6]^{3-} + e^- \rightarrow Mn(OH)_2 + 4OH^- \quad [3]$$

Example 6

Two rechargeable cells were assembled to test different membranes' performances. Each cell had a $MnO_2$ cathode and a Zn anode. The cathode was a mixture of EMD and multiwall carbon nanotubes as the conductive matrix. $Bi_2O_3$ and Cu were added to improve the rechargeability. The anode was a mixture of Zn, ZnO and Teflon. Each anode was wrapped with one layer of cellophane, and the electrolyte was 25% KOH. In one cell, the cathode was wrapped with one layer of cellophane. In the other cell, the cathode was wrapped with one layer of GO/PVA-III.

Figure 9:
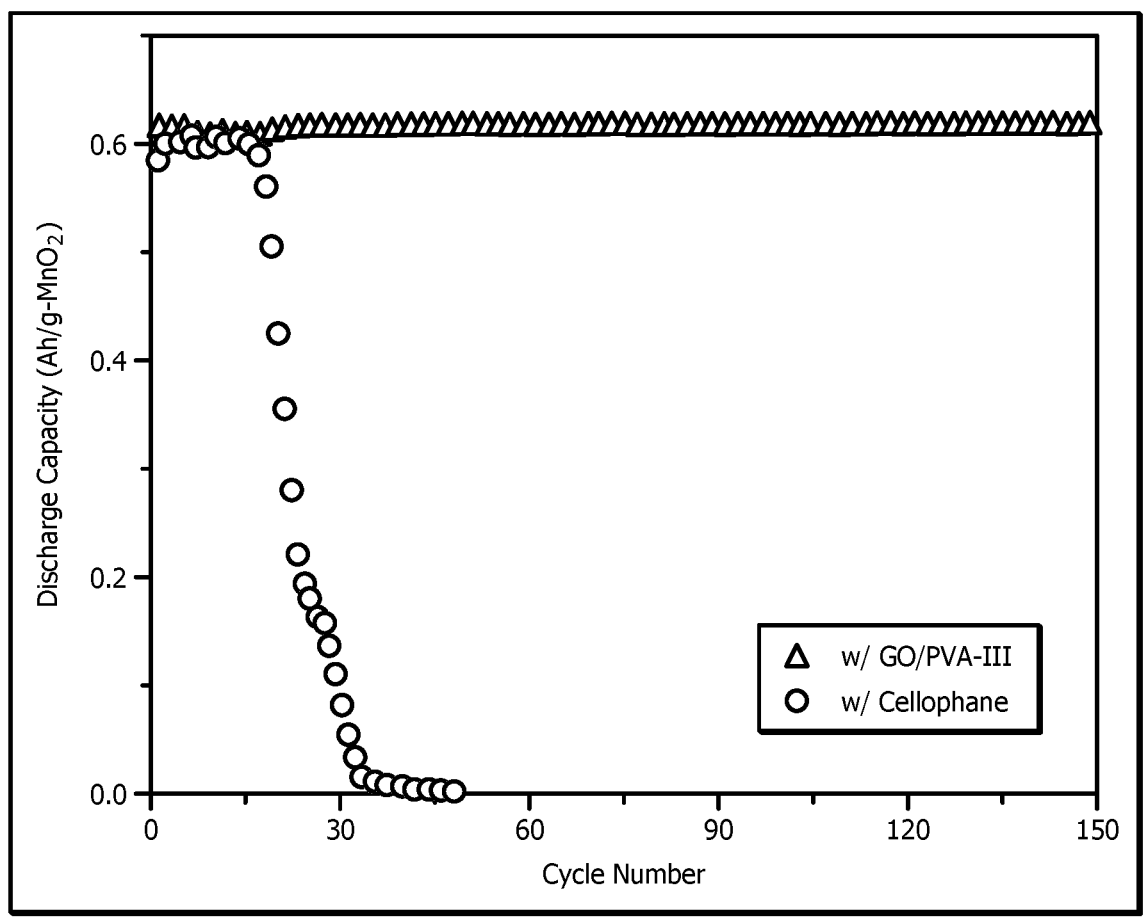
FIG. 9 is a graph illustrating specific discharge capacities of rechargeable alkaline $Zn/MnO_2$ cells with different membranes vs. cycle number.

The specific discharge capacity curves are shown in FIG. 9. The addition of $Bi_2O_3$ was reported to convert the $\gamma\text{-}MnO_2$ to a layer structured $\delta\text{-}MnO_2$, and Cu further stabilized the layer structure to run for thousands of cycles. However, a long cycle life is only achievable in the absence of zincate. Zincate ions presenting in the cathode side will react to form $ZnMn_{24}$, which is an irreversible spinel material, and thus lead to the failure of the cell. It is apparent from FIG. 7 that the cell with a GO/PVA-III ran quite stably for more than 150 cycles, with full 2-electron capacity achieved, while the cell with cellophane failed after only 20 cycles due to zincate poisoning.

Example 7

Figure 10:
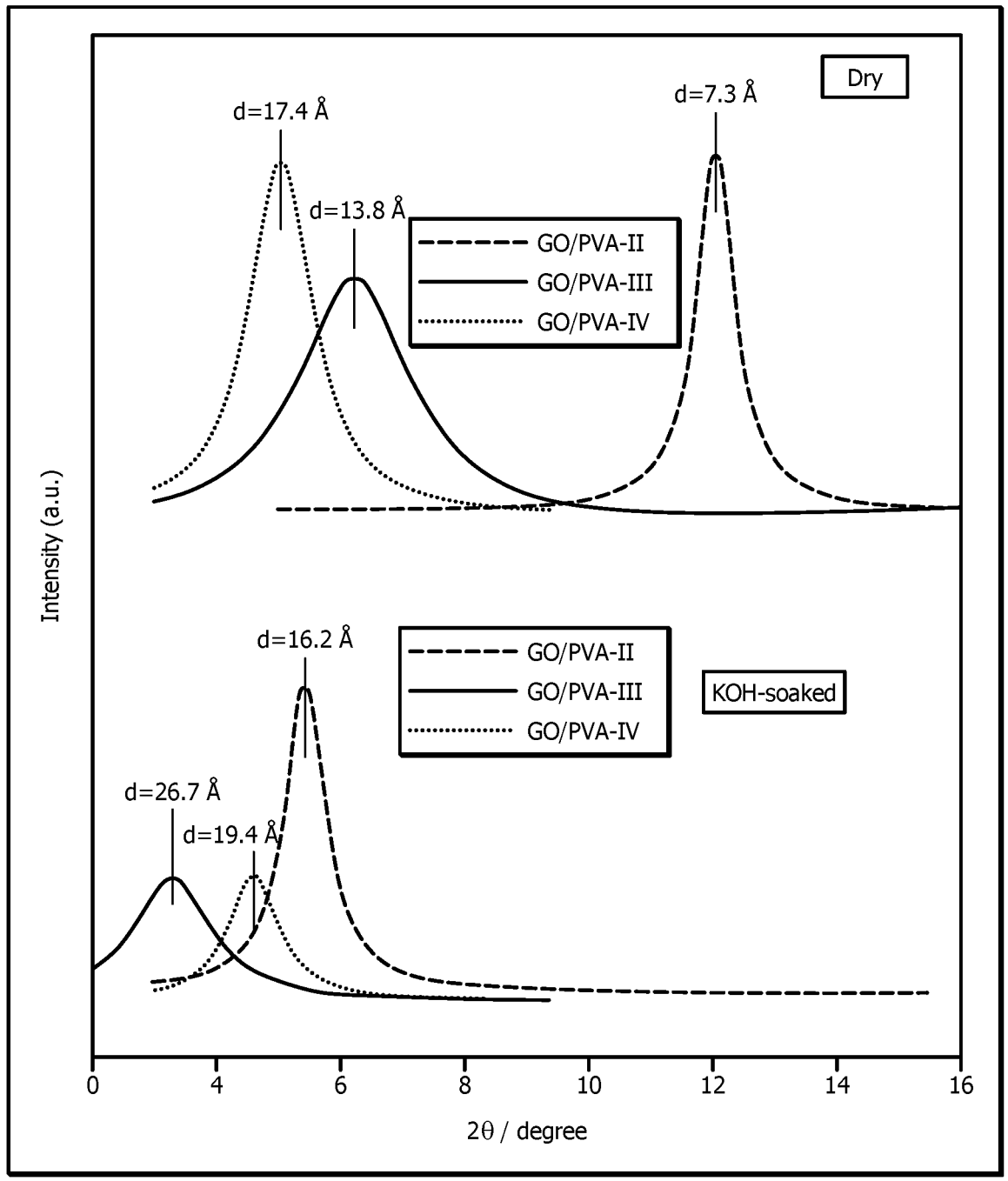
FIG. 10 is a graph illustrating XRD patterns of different membranes at their dry states and electrolyte soaked states to demonstrate the interlayer spacing change between states.

In order to control the swelling degree of the GO/PVA membrane, and thus improve its selectivity, the effective ion selective layer of membrane GO/PVA-III is further cross-linked with glutaric dialdehyde to suppress its swelling degree when soaked in electrolyte. This new type of membrane is denoted as GO/PVA-IV. FIG. 10 shows the XRD patterns of different membranes at their dry states and electrolyte soaked states and compares the interlayer spacing change. It is apparent that by introducing cross-linking to the GO/PVA laminates, it swelling degree is significantly reduced, which means a reduced free volume for electrolyte and decreased zincate ion permeability.

Having described various devices, systems, and methods, specific embodiments can include, but are not limited to:

In a first embodiment, an alkaline battery comprises an anode; a cathode; a separator disposed between the anode and the cathode, wherein the separator comprises at least one ion selective layer; and an electrolyte in fluid communication with the anode, the cathode, and the separator.

A second embodiment can include the alkaline battery of the first embodiment, wherein the ion selective layer comprises at least one of graphene, graphene oxide, reduced graphene oxide, functionalized graphene, or combinations thereof.

A third embodiment can include the alkaline battery of the first or second embodiment, wherein the ion selective layer is configured to selectively block zincate ions.

A fourth embodiment can include the alkaline battery of the third embodiment, wherein the ion selective membrane is applied with one or more non-selective separator membranes between the anode and the cathode.

A fifth embodiment can include the alkaline battery of the fourth embodiment, wherein the non-selective separator membranes are nonwovens or polymer films fabricated from nylon, polyester, polyethylene, polypropylene, poly(tetrafluoroethylene) (PTFE), poly(vinyl chloride) (PVC), polyvinyl alcohol, cellulose or combinations thereof.

A sixth embodiment can include the alkaline battery of any one of the first to fifth embodiments, wherein at least one of the anode or the cathode comprises an ion selective material.

In a seventh embodiment, a method for producing a composite ion selective membrane comprises dispersing a polymer into a solvent to form a polymer dispersion; dispersing an ion selective material into the solvent; mixing the polymer dispersion with the ion selective material to form a mixture; and forming a composite ion selective membrane out of the mixture.

An eighth embodiment can include the method of the seventh embodiment, wherein the polymer is poly(vinyl alcohol), poly(acrylic acid), carboxymethyl cellulose, polypropylene, polyethylene, poly(vinyl chloride), poly(tetrafluoroethylene) or combinations thereof.

A ninth embodiment can include the method of the seventh or eighth embodiment, wherein the solvent is water, an organic solvent, or a combination thereof.

A tenth embodiment can include the method of any one of the seventh to ninth embodiments, wherein the ion selective material is a graphene.

An eleventh embodiment can include the method of the tenth embodiment, wherein the graphene material is graphene, graphene oxide, reduced graphene oxide, functionalized graphene, or any combination thereof.

A twelfth embodiment can include the method of any one of the seventh to eleventh embodiments, wherein the step of dispersing the polymer comprises stirring, ultrasonication, or vibration mixing.

A thirteenth embodiment can include the method of any one of the seventh to twelfth embodiments, wherein the step of dispersing the functionalized graphene material comprises stirring, ultrasonication, or vibration mixing.

A fourteenth embodiment can include the method of any one of the seventh to thirteenth embodiments, wherein the polymer dispersion contains 1% to 99% of the polymer.

A fifteenth embodiment can include the method of any one of the seventh to fourteenth embodiments, wherein the functionalized graphene dispersion contains 0.1% to 10% functionalized graphene.

A sixteenth embodiment can include the method of any one of the seventh to fifteenth embodiments, wherein the composite ion selective membrane is formed through vacuum assisted filtration, pressure assisted filtration, solution casting with air drying or vacuum drying, spin coating, or forming the membrane at the air-liquid interface.

A seventeenth embodiment can include the method of any one of the seventh to sixteenth embodiments, wherein the composite ion selective membrane has a polymer to functionalized graphene material weight ratio between 0.001:1 to 1000:1.

An eighteenth embodiment can include the method of any one of the seventh to seventeenth embodiments, wherein the composite ion selective membrane has a thickness in the range from 1 nm to 1 mm.

A nineteenth embodiment can include the method of any one of the seventh to eighteenth embodiments, wherein the composite ion selective membrane has a structure of (1) the functionalized graphene material homogeneously dispersed in a polymer matrix of the polymer, or (2) graphene monolayers laminated on top of each other, with or without polymer chains in between.

A twentieth embodiment can include the method of any one of the seventh to nineteenth embodiments, wherein the composite ion selective membrane is coated with one or more layers of polymers.

A twenty first embodiment can include the method of the twentieth embodiment, wherein the one or more layers of polymer is poly(vinyl alcohol), poly(acrylic acid), carboxymethyl cellulose, polypropylene, polyethylene, poly(vinyl chloride), poly(tetrafluoroethylene) or combinations thereof.

A twenty second embodiment can include the method of any one of the seventh to twenty first embodiments, wherein the composite ion selective membrane is coated with a cross-linking agent.

In a twenty third embodiment, a separator for a battery comprises at least one ion selective layer positioned between an anode and a cathode in the battery.

A twenty fourth embodiment can include the separator of the twenty third embodiment, wherein the ion selective layer comprises at least one of graphene, graphene oxide, reduced graphene oxide, functionalized graphene, or combinations thereof.

A twenty fifth embodiment can include the separator of the twenty third or twenty fourth embodiment, wherein the ion selective layer is configured to selectively block zincate ions.

A twenty sixth embodiment can include the separator of any one of the twenty third to twenty fifth embodiments, wherein the ion selective membrane is applied with one or more non-selective separator membranes between the anode and the cathode.

A twenty sixth embodiment can include the separator of any one of the twenty third to twenty sixth embodiments, wherein the ion selective membrane is coated with one or more polymer layers.

A twenty eighth embodiment can include the separator of the twenty seventh embodiment, wherein the polymer layers comprise nylon, polyester, polyethylene, polypropylene, poly(tetrafluoroethylene) (PTFE), poly(vinyl chloride) (PVC), polyvinyl alcohol, cellulose, or any combination thereof.

In a twenty ninth embodiment, a method for producing the anode or cathode comprises selecting a metal, metal oxide, metal hydroxide, or any combinations thereof as the anode material or cathode material; dispersing functionalized graphene material into a solvent to form a functionalized graphene dispersion; coating the anode material or cathode material with functionalized graphene material; combining a binder and a conductive additive to form a mixture; disposing the mixture on a current collector; and forming an anode or cathode based on disposing the mixture on the current collector.

A thirtieth embodiment can include the method of the twenty ninth embodiment, wherein the anode is zinc, lithium, aluminum, magnesium, iron, cadmium or a combination thereof.

A thirty first embodiment can include the method of the twenty ninth or thirtieth embodiment, wherein the cathode is manganese, nickel, silver, lead, copper or a combination thereof.

A thirty second embodiment can include the method of any one of the twenty ninth to thirty first embodiments, wherein the cathode or anode is a pasted electrode or a metal foil or plate.

A thirty third embodiment can include the method of any one of the twenty ninth to thirty second embodiments, wherein the conductive matrix is graphite, carbon black, carbon nanotubes, graphene, graphyne, and combinations thereof, taking up 0% to 50% of the mixture.

A thirty fourth embodiment can include the method of any one of the twenty ninth to thirty third embodiments, wherein the binder is Teflon, carboxymethyl cellulose, polyvinyl alcohol, polyvinylidene fluoride or combinations thereof, taking up 0% to 20% of the mix.

A thirty fifth embodiment can include the method of any one of the twenty ninth to thirty fourth embodiments, wherein the current collector is copper mesh, a copper foil, a nickel mesh, a nickel foil, a copper plated nickel mesh or foil, or a nickel-plated copper mesh or foil.

A thirty sixth embodiment can include the method of any one of the twenty ninth to thirty fifth embodiments, wherein the solvent is water, an organic solvent, or a combination thereof.

A thirty seventh embodiment can include the method of any one of the twenty ninth to thirty sixth embodiments, wherein the functionalized graphene material is graphene, graphene oxide, reduced graphene oxide, or combinations thereof.

A thirty eighth embodiment can include the method of any one of the twenty ninth to thirty seventh embodiments, wherein the functionalized graphene dispersion is obtained through stirring, ultrasonication, or vibration mixing.

A thirty ninth embodiment can include the method of any one of the twenty ninth to thirty eighth embodiments, wherein the functionalized graphene dispersion contains 0.1% to 10% functionalized graphene.

A fortieth embodiment can include the method of any one of the twenty ninth to thirty ninth embodiments, wherein the anode or the cathode comprises a structural feature selected from the group consisting of electrode particles, an electrode foil, an electrode plate and a pasted electrode and functionalized graphene material is used to coat the electrode particles, the electrode foil, the electrode plate, or the pasted electrode.

A forty first embodiment can include the method of any one of the twenty ninth to fortieth embodiments, wherein the ratio of the or metal oxide or metal hydroxide or combinations thereof to the functionalized graphene material is between from 1 to 1000.

A forty second embodiment can include any one of the first to sixth embodiments, wherein the alkaline battery comprises at least one of a graphene modified separator, a graphene modified cathode, or a graphene modified anode.

A forty third embodiment can include any one of the first to sixth embodiments, wherein the electrolyte is a solution of potassium hydroxide, sodium hydroxide, lithium hydroxide and combinations thereof, with a concentration between 5-50 wt %.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An alkaline battery comprising:
an anode;
a cathode;
a separator disposed between the anode and the cathode, wherein the separator comprises at least one ion selective layer comprising a dispersion of a polymer and an ion selective material mixed into the dispersion, wherein the ion selective material comprises at least one of graphene, graphene oxide, reduced graphene oxide, functionalized graphene, or combinations thereof, wherein at least a portion of the polymer is cross-linked, and wherein sheets of the ion selective material are horizontally aligned and orientated in layers on top of each other within the ion selective layer, wherein the sheets of the ion selective material are horizontally aligned when planes of the sheets of the ion selective material are parallel to a face of the at least one ion selective layer; and
an electrolyte in fluid communication with the anode, the cathode, and the separator.

2. The alkaline battery of claim 1, wherein the ion selective layer is configured to selectively block zincate ions.

3. The alkaline battery of claim 2, wherein the ion selective layer is applied with one or more non-selective separator membranes between the anode and the cathode.

4. The alkaline battery of claim 3, wherein the non-selective separator membranes are nonwovens or polymer films fabricated from nylon, polyester, polyethylene, polypropylene, poly(tetrafluoroethylene) (PTFE), poly(vinyl chloride) (PVC), polyvinyl alcohol, cellulose, or combinations thereof.

5. The alkaline battery of claim 1, wherein at least one of the anode or the cathode comprises the ion selective material as a layer or a coating on the anode or the cathode.

6. A method for producing a composite ion selective membrane for an alkaline battery, the method comprising:
dispersing a polymer into a solvent to form a polymer dispersion;
dispersing an ion selective material into the solvent;
mixing the ion selective material into the polymer dispersion to form a mixture;
aligning and orienting the ion selective material within the polymer dispersion;
cross-linking at least a portion of the polymer; and
forming the composite ion selective membrane for the alkaline battery out of the mixture, wherein the ion selective material comprises at least one of graphene, graphene oxide, reduced graphene oxide, functionalized graphene, or combinations thereof, and wherein sheets of the ion selective material are horizontally aligned and orientated in layers on top of each other within the composite ion selective membrane based on the aligning and orienting, wherein the sheets of the ion selective material are horizontally aligned when planes of the sheets of the ion selective material are parallel to a face of the composite ion selective membrane.

7. The method of claim 6, wherein the polymer is poly(vinyl alcohol), poly(acrylic acid), carboxymethyl cellulose, polypropylene, polyethylene, poly(vinyl chloride) (PVC), poly(tetrafluoroethylene) (PTFE), or combinations thereof.

8. The method of claim 6, wherein the solvent is water, an organic solvent, or a combination thereof.

9. The method of claim 6, wherein the ion selective material is a graphene material.

10. The method of claim 6, wherein the step of dispersing the polymer comprises stirring, ultrasonication, or vibration mixing.

11. The method of claim 6, wherein the ion selective material comprises a functionalized graphene material, and wherein the step of dispersing the ion selective material comprises stirring, ultrasonication, or vibration mixing.

12. The method of claim 7, wherein the ion selective material comprises a functionalized graphene material, and wherein the polymer dispersion contains 0.1% to 10% functionalized graphene.

13. The method of claim 6, wherein the composite ion selective membrane is formed through vacuum assisted filtration, pressure assisted filtration, solution casting with air drying or vacuum drying, spin coating, or forming the membrane at an air-liquid interface.

14. The method of claim 6, wherein the composite ion selective membrane has a thickness in a range from 1 nm to 1 mm.

15. The method of claim 6, wherein the composite ion selective membrane has a structure of graphene monolayers laminated on top of each other, with or without polymer chains in between.

16. The method of claim 6, wherein the composite ion selective membrane is coated with one or more layers of polymers.

17. The method of claim 16, wherein the one or more layers of polymer are poly(vinyl alcohol), poly(acrylic acid), carboxymethyl cellulose, polypropylene, polyethylene, poly(vinyl chloride) (PVC), poly(tetrafluoroethylene) PTFE), or combinations thereof.

18. A separator for an alkaline battery comprising:
at least one ion selective layer comprising a dispersion of a polymer and an ion selective material mixed into the dispersion, wherein the ion selective material comprises at least one of graphene, graphene oxide, reduced graphene oxide, functionalized graphene, or combinations thereof positioned between an anode and a cathode in the battery, wherein at least a portion of the polymer in the ion selective layer is cross-linked, and wherein sheets of the ion selective material are horizontally aligned and orientated in layers on top of each other within the ion selective layer, wherein the sheets of the ion selective material are horizontally aligned when planes of the sheets of the ion selective material are parallel to a face of the at least one ion selective layer,
wherein the separator is disposed in the alkaline battery.

19. The separator of claim 18, wherein the ion selective layer is configured to selectively block zincate ions.

20. The separator of claim 18, wherein the ion selective layer is applied with one or more non-selective separator membranes between the anode and the cathode.

21. The separator of claim 18, wherein the ion selective layer comprises one or more polymer layers coated on a layer with the ion selective material.

22. The separator of claim 21, wherein the polymer layers comprise nylon, polyester, polyethylene, polypropylene, poly(tetrafluoroethylene) (PTFE), poly(vinyl chloride) (PVC), polyvinyl alcohol, cellulose, or any combination thereof.

23. The method of claim 6, wherein the ion selective material is a graphene oxide material.

24. The alkaline battery of claim 1, wherein the separator comprises a laminated graphene oxide and a polyvinyl alcohol membrane.

25. The alkaline battery of claim 24, wherein the anode comprises zinc and the cathode comprises manganese dioxide.

* * * * *